United States Patent
Bianchi et al.

(10) Patent No.: US 6,599,208 B2
(45) Date of Patent: Jul. 29, 2003

(54) CHAIN TRANSMISSION DEVICE FOR CONTROLLING THE TIMING SYSTEM OF AN INTERNAL COMBUSTION ENGINE WITH TWO OVERHEAD CAMSHAFTS

(75) Inventors: Pietro Bianchi, Turin (IT); Dragoljub Milanovic, St. Gallen (CH)

(73) Assignee: Iveco Fiat S.p.A., Turin (IT)

( * ) Notice: Subject to any disclaimer, the term of this patent is extended or adjusted under 35 U.S.C. 154(b) by 0 days.

(21) Appl. No.: 09/747,816

(22) Filed: Dec. 22, 2000

(65) Prior Publication Data

US 2002/0082129 A1 Jun. 27, 2002

(51) Int. Cl.⁷ ............................... F16H 7/00; F01L 1/02
(52) U.S. Cl. ....................................... 474/84; 123/90.31
(58) Field of Search ........................... 474/84, 85, 150, 474/152, 140, 111, 148; 123/90.31, 90.27

(56) References Cited

U.S. PATENT DOCUMENTS

| | | | | |
|---|---|---|---|---|
| 4,553,509 A | * | 11/1985 | Mezger et al. ............ | 123/192.1 |
| 4,753,199 A | | 6/1988 | Melde-Tuczai et al. | |
| 5,010,859 A | * | 4/1991 | Ogami et al. ............ | 123/90.31 |
| 5,014,655 A | * | 5/1991 | Ampferer ................ | 123/90.31 |
| 5,058,458 A | | 10/1991 | Odai | |
| 5,231,961 A | | 8/1993 | Shimada et al. | |
| 5,295,459 A | * | 3/1994 | Suzuki et al. ............ | 123/90.31 |
| 5,665,019 A | * | 9/1997 | Sheffer et al. ............ | 474/148 |

FOREIGN PATENT DOCUMENTS

| | | | |
|---|---|---|---|
| EP | 0124433 A2 | * | 11/1984 |
| JP | 03081509 A | * | 4/1991 |
| JP | 07167232 A | * | 7/1995 |

OTHER PUBLICATIONS

Patent Abstract of Japanese Application No. 07246827, filed Aug. 31, 1995 entitled "Camshaft Driving Device for V–Type Engine".
European Search Report completed Jul. 12, 2000 for European Patent Application No. EP 99 12 5946.

* cited by examiner

Primary Examiner—Marcus Charles
(74) Attorney, Agent, or Firm—Pitney, Hardin, Kipp & Szuch LLP

(57) ABSTRACT

A chain transmission device for controlling the timing system of an internal combustion engine with two overhead camshafts, and having a first chain transmission from the drive shaft to an intermediate shaft, and a second chain transmission from the intermediate shaft to both the camshafts; and wherein the first transmission defines a stepdown transmission ratio between the drive shaft and the intermediate shaft; the second transmission defines a stepdown transmission ratio between the intermediate shaft and the camshafts; the chain of the second transmission has a pitch smaller than the pitch of the chain of the first transmission; and the intermediate shaft is defined by the drive shaft of a fuel pump of the engine.

4 Claims, 1 Drawing Sheet

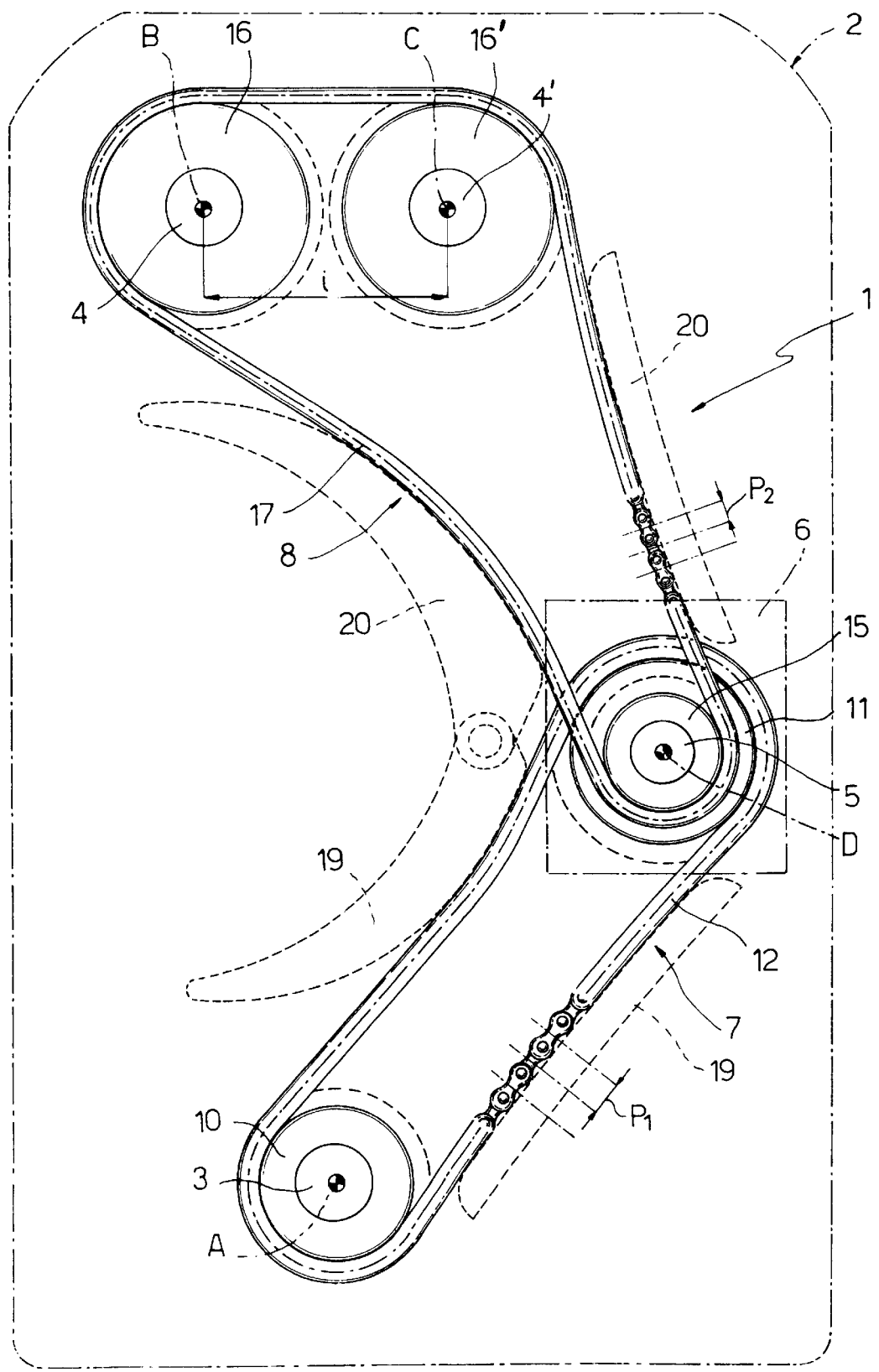

CHAIN TRANSMISSION DEVICE FOR CONTROLLING THE TIMING SYSTEM OF AN INTERNAL COMBUSTION ENGINE WITH TWO OVERHEAD CAMSHAFTS

FIELD OF THE INVENTION

The present invention relates to a chain transmission device for controlling the timing system of an internal combustion engine with two overhead camshafts.

BACKGROUND OF THE INVENTION

Single-chain control of both the camshafts of internal combustion engines of the above type poses serious problems in terms of size.

That is, the distance between the axes of the camshafts is a design feature which depends on the valve arrangement, and, for reasons of size, should be as small as possible.

On the other hand, the drive shaft the camshafts have a specific transmission ratio (1:2), which means, assuming both camshafts are controlled by a single chain controlled by a sprocket on the drive shaft, the diameter of the driven sprockets on the camshafts is twice the diameter of the drive shaft sprocket.

As the pitch of the chain is substantially imposed by the power transmitted, and the number of teeth, and hence the diameter, of the drive shaft sprocket cannot be reduced beyond a given limit, the resulting diameter of the driven sprockets is fairly large and incompatible with the design distance between the camshaft axes.

In some known engines, the problem has been partially solved using two chain transmissions in series with each other: a first transmission from the drive shaft to an idle intermediate shaft, and a second transmission from the intermediate shaft to the two camshafts. Such a solution, however, is relatively complex and expensive, by calling for an additional intermediate shaft, which serves no other purpose, and for respective supporting means on the engine.

SUMMARY OF THE INVENTION

It is an object of the present invention to provide a chain transmission device for an internal combustion engine with two overhead camshafts, designed to overcome the aforementioned drawbacks in a straightforward, effective, low-cost manner.

According to the present invention, there is provided a chain transmission device for controlling the timing system of an internal combustion engine with two overhead camshafts, and comprising a first chain transmission from the drive shaft to an intermediate shaft, and a second chain transmission from the intermediate shaft to both of the camshafts; wherein the first transmission defines a step-down transmission ratio between the drive shaft and the intermediate shaft; and the second transmission defines a stepdown transmission ratio between the intermediate shaft and the camshafts; characterized in that the intermediate shaft is the drive shaft of a fuel pump of said engine; and in that the chain of the second transmission has a pitch smaller than the pitch of the chain of the first transmission.

A preferred, non-limiting embodiment of the present invention will be described by way of example with reference to the accompanying drawing.

BRIEF DESCRIPTION OF THE DRAWING

The FIGURE shows schematically the chain transmission device of the present invention.

DETAILED DESCRIPTION OF THE INVENTION

Number 1 in the accompanying drawing indicates a chain transmission device for controlling the timing system of an internal combustion engine, in particular a diesel engine, 2.

Engine 2 comprises a drive shaft 3 of axis A and angular speed $\omega_M$; and two overhead camshafts 4,4' of speed $\omega_C = \frac{1}{2}\omega_M$ and having respective axes B, C parallel to each other and to axis A and separated by a distance i.

Engine 2 also comprises an intermediate shaft 5 for driving a high-pressure fuel pump 6 forming part of a storage injection system (not shown). Using a storage system allows a certain amount of freedom in selection of the angular speed ($\omega_I$) of pump 6, i.e. of intermediate shaft 5. In such a system, the speed of the pump is preferably the same as that of the drive shaft, or lower according to the equation $N/2 \cdot n_P$, where N is a whole number, and $n_P$ the number of pumping members (normally 3 or 4) of the pump. Such a relationship ensures a whole number of pumping strokes in each engine cycle (two revolutions of the drive shaft), and hence a known constant phase relationship between variations in the feed pressure of the injectors and the points in the engine cycle—predetermined and the same for each cycle—at which pressure is determined by the electronic injection control system (as is known, in storage systems, the amount of fuel injected is controlled electronically by varying the opening time of the pins).

In the case of three pumping members, pump speed must equal N/6 the engine speed, e.g. 5/6.

Device 1 comprises a first chain transmission 7 interposed between drive shaft 3 and intermediate shaft 5; and a second chain transmission 8 interposed between intermediate shaft 5 and the two camshafts 4,4'.

First transmission 7 comprises a drive sprocket 10 fitted to drive shaft 3, a driven sprocket 11 fitted to intermediate shaft 5, and a chain 12 meshing with sprockets 10 and 11; and the number of teeth of sprockets 10, 11 is such as to achieve, between drive shaft 3 and intermediate shaft 5, a step-down transmission ratio $t_1 = \omega_I/\omega_M$ ranging between ½ and 1 and, for the reasons given above, conveniently defined by a fraction $N/2 \cdot n_P$, e.g. 5:6. By way of example, sprockets 10 and 11 may comprise 25 and 30 teeth respectively.

Second transmission 8 comprises a drive sprocket 15 fitted to intermediate shaft 5, a pair of driven sprockets 16,16' fitted to respective camshafts 4,4', and one chain 17 meshing with sprocket 15 and both sprockets 16,16'. The number of teeth of sprockets 15 and 16,16' is such as to give a transmission ratio $t_2 = \omega_C/\omega_I$, which, together with first transmission 7, defines a total stepdown ratio 1:2 between drive shaft 3 and each of camshafts 4,4'. In the example shown, $t_2$ equals 3:5, and sprockets 15 and 16,16' may comprise 24 and 40 teeth, respectively.

According to a further characteristic of the present invention, chain 17 may be sized for less power, and therefore have a smaller pitch, than chain 12. By way of example, the two pitches may be 8 and 9.525 mm respectively.

Chains 12 and 17 are guided in the usual way by respective pairs of shoes 19, 20; and one of the shoes in each pair is movable by elastic means (not shown) to tension the respective chain.

The advantages of device 1 according to the teachings of the present invention will be clear from the foregoing description.

Using shaft 5 of pump 6 as an intermediate shaft for both transmissions 7, 8 provides for achieving a two-stage stepdown ratio with no need for an idle intermediate shaft which serves no other purpose.

Moreover, the smaller pitch of chain 17 as compared with chain 12 provides for reducing the diameter of sprockets 16,16' of camshafts 4,4', and hence distance i between the relative axes.

Clearly, changes may be made to device 1 without, however, departing from the scope of the accompanying claims. In particular, the transmission ratios of the individual transmissions may vary.

What is claimed is:

1. A chain transmission device (1) for controlling a timing system of an internal combustion engine (2) with two overhead camshafts (4, 4'), and comprising a first chain transmission (7) from a drive shaft (3) to an intermediate shaft (5), said first chain transmission (7) including a drive sprocket (10) on said drive shaft (3), a driven sprocket (11) on said intermediate shaft (5), and a first chain (12) meshing with and trained around said drive sprocket (10) and said driven sprocket (11);

and a second chain transmission (8) from said from said intermediate shaft (5) to both said camshafts (4, 4'), said second chain transmission (8) including a drive sprocket (15) on said intermediate shaft (5), driven sprockets (16,16') on camshafts (4, 4'), respectively, and a second chain (17) meshing with and trained around said drive sprocket (15) and said driven sprockets (16,16');

wherein said first transmission (7) defines a first step-down transmission ratio ($t_1$) between said drive shaft (3) and said intermediate shaft (5); and said second transmission (8) defines a second step-down transmission ratio ($t_2$) between said intermediate shaft (5) and said camshafts (4,4');

characterized in that said intermediate shaft (5) is a drive shaft of a fuel pump (6) of said engine (2); and in that said second chain (17) of said second transmission (8) has a pitch ($P_2$) smaller than the pitch ($P_1$) of said first chain (12) of said first transmission (7).

2. A device as claimed in claim 1, characterized in that said first transmission ratio ($t_1$) ranges between ½ and 1.

3. A device as claimed in claim 1, characterized in that said pump (6) is a high-pressure pump of a storage injection system, said highpressure pump having at least one pumping member.

4. A device as claimed in claim 3, characterized in that said first transmission ratio ($t_1$) is defined by a fraction $N/2*n_p$, where N is a whole number, and np is the number of pumping members of the pump (6).

* * * * *